INVENTORS
JAMES A. CANADAY
JAMES B. GASTON
HERBERT C. LOESCHEN
CARL A. WILEY

ATTORNEY

United States Patent Office 3,450,869
Patented June 17, 1969

3,450,869
HIGH SENSITIVITY UNAMBIGUOUS CORRELATOR
Carl A. Wiley, Corona Del Mar, James A. Canaday, Fullerton, Herbert C. Loeschen, Anaheim, and James B. Gaston, La Mirada, Calif., assignors to North American Rockwell Corporation, a corporation of Delaware
Filed Dec. 8, 1965, Ser. No. 512,335
Int. Cl. G06g 7/19
U.S. Cl. 235—181          9 Claims

ABSTRACT OF THE DISCLOSURE

Intermediate frequency apparatus for correlating two time-varying signals, including means for reducing the ambiguities associated with the cosine sensitivity factor of coherent IF processing. Ancillary IF means changes the frequency of a local oscillator input to the IF stage for each of the two signal-to-be-correlated, and compensatory phase-shift means adjusts the phase of the ancillary frequency change to one of the local oscillator inputs as a function of a selected correlation interval.

Background of the invention

The subject invention relates to apparatus for correlating two time varying signals, and more particularly to an improved correlator employing two signalling channels for processing two time-varying signals at an intermediate frequency.

In the field of data processing, it is frequently desirable, if not necessary, to extract information from a noisy or randomly appearing signal. Several processes have been employed in the prior art for extracting such information, the utility of each such process depending upon the type of information sought and the style of the information-bearing signal.

For example, where the spectrum of an information bearing signal is known, and is further known to be spectrally distinguishable from the noise associated with it, such signal may be recovered from a noisy signal source by means of bandpass limiting or frequency-filtering. On the other hand, where the spectrum of the information-bearing signal is contained within that of the noise energy, frequency-filtering is not effective to suppress the noise energy and other techniques are employed. One of such other techniques useful in processing radar range information, where the radar return is known to have a like periodicity as the transmitted radar energy is to employ range-coherent integration means, such as a tapped delay line (the intervals between adjacent taps of which corresponds to such periodicity), by which corresponding portions of successive unipolar range trace signals are additively combined, that component of the radar signals due to a discrete target at such range cumulatively combining to provide an enhanced target return and the noise component of such range trace portion tending to be attenuated or mutually cancelling.

Another method, referred to as a coherent method, for enhancing the signal-to-noise ratio of a noisy information bearing radar echo signal having a single carrier frequency, is to phase detect the echo signal, using a portion of the transmitter energy as a phase reference or model. However, because the response of the phase sensitive detector is sensitive to the phase-angle between corresponding frequencies of the echo signal and reference signal, it may be necessary to use a second phase-sensitive detector in parallel with the first and having the phase reference frequency shifted in quadrature time phase, in order to avoid the loss of information.

In the above-described radar system applications, generally the intelligence sought is merely the occurrence of the echo signal, and more particularly the interval of occurrence subsequent to the transmitted energy which produces such echo as an indication of target range. Further, such data processes employ techniques relying on a prior knowledge of the sinusoidal carrier frequency employed. In other circumstances the information-bearing signal may not be sinusoidal in nature, but a randomly appearing noise signal. Where such signal is known to be the resultant or output of a physical system which has been excited by a forcing function or input of similar quality as the output signal, the data processor may be required to extract information concerning a relationship between the two signals which relationship is presumed fixed over the interval of the concomitant observation of such randomly varying signals.

One type of information sought might be the amplitude ratio of the spectral energy per cycle of the output to the input energy and the associated phase relation as a function of frequency, as a means of deducing the frequency-response or transfer function of the physical system excited by such randomly varying forcing function. Such a data processor is referred to in the art as a (frequency-domain) spectral density analyzer, and normally employs three channels: a first reference signal channel, a second reference channel in quadrature time phase relation with the first, and an input signal channel, for like reason as discussed above in connection with the discussion of the coherent radar receiver. Another type of information sought might be the time interval or time-phase delay associated with a maximum correlation between two time-varying signals, which information is obtained from a (time domain) correlator. Such device continuously multiplies and integrates the signals to be correlated for each of a number of selectively sampled delay intervals interposed in one of the received signal channels. Where the same signal source is used as both a reference and a received signal, the device is referred to as an autocorrelator. Where two different signal sources are used for the reference and the received signal, the correlator is referred to as a cross-correlator.

Applications of such correlators have included passive detection and ranging, as described for example in U.S. Patent 3,171,126, issued Feb. 23, 1965, to C. A. Wiley for Passive Detection and Ranging System; and in a cross-correlation receiver for increasing the effective range of a radar system, as described for example at pages 418–421 of the text, "Introduction to Radar Systems," by Skolnik, published by McGraw-Hill (1962). The time interval sampling means may be an adjustable time-delay as shown in the above noted patent to Wiley, or a plurality of correlators and a tapped delay line may be used, as shown in FIG. 9.8 at page 420 of the above noted text by Skolnik.

Such prior art correlators have necessarily employed bandpass limited elements in processing the signals of interest at intermediate frequencies, whereby the cooperation thereof with the delay interval sampling element introduces certain ambiguities in the results obtained from such correlators. While such ambiguities may be avoided by video processing or detection of the signals prior to correlation, yet the correlation of video detected signals provides results of limited utility for the reason that such process is insensitive to the initial time-phase relation between corresponding referenced and received signal components of like frequency. In other words, video processors demonstrate reduced sensitivity, thereby limiting the maximum noise levels with which they may be used.

By means of the concept of the subject invention, such disadvantages of prior art correlators are avoided, and the several advantages of intermediate frequency processing and video processing are obtained without suffering the associated prior art disadvantages of each.

In a preferred embodiment of the subject invention here is provided a two-channel correlator for determining the optimum sampling time interval for maximizing the correlation of two input signals, each channel of which is the intermediate frequency type responsive to a common intermediate frequency and having a local oscillator input commonly responsive to a single common local oscillator frequency. There is also provided ancillary intermediate frequency means for changing the frequency of the local oscillator input to each of the two intermediate frequency channels by a preselected amount. There is further provided adjustable phase shift means for compensatorily phase-shifting the ancillary intermediate frequency change of the frequency-changed local oscillator input applied to one of the intermediate frequency signal channels.

In normal operation of the above described arrangement, the adjustment of the sampled delay interval in attempting to maximize the correlator output also causes a phase-shift of that one of the two intermediate frequency outputs with which it is associated, which phase-shift, if not compensated for, tends to result in ambiguities in the correlator output. However, the compensatory intermediate frequency phase-shift, introduced in the ancillary frequency change of the local oscillator frequency input at one of the intermediate frequency channels, functions to reduce the differential phase shift occurring between the two intermediate frequency outputs by such sampling interval. Hence, ambiguities in the correlator output are minimized. Accordingly, it is an object of the subject invention to provide an improved signal correlator.

It is another object of the invention to provide means for minimizing the ambiguities in the output of correlator of the intermediate frequency processor type.

It is yet another object of the invention to provide a correlator having the unambiguous response envelope of a video processor while retaining the signal sensitivity of a coherent interemdiate frequency data processor.

It is still another object of the subject invention to provide means for compensatorily phase-shifting the local oscillator input to one of two intermediate frequency correlator channels for reducing the differential phase resulting between the outputs of such channels in selectively sampling for an optimum time interval.

It is further an object of the invention to minimize the differential phase occurring between the two channel outputs of an intermediate frequency signal correlator.

These and other objects of the invention will become apparent from the following description taken together with the accompanying drawings in which.

In the figures, like reference characters refer to like parts.

Figure 1:
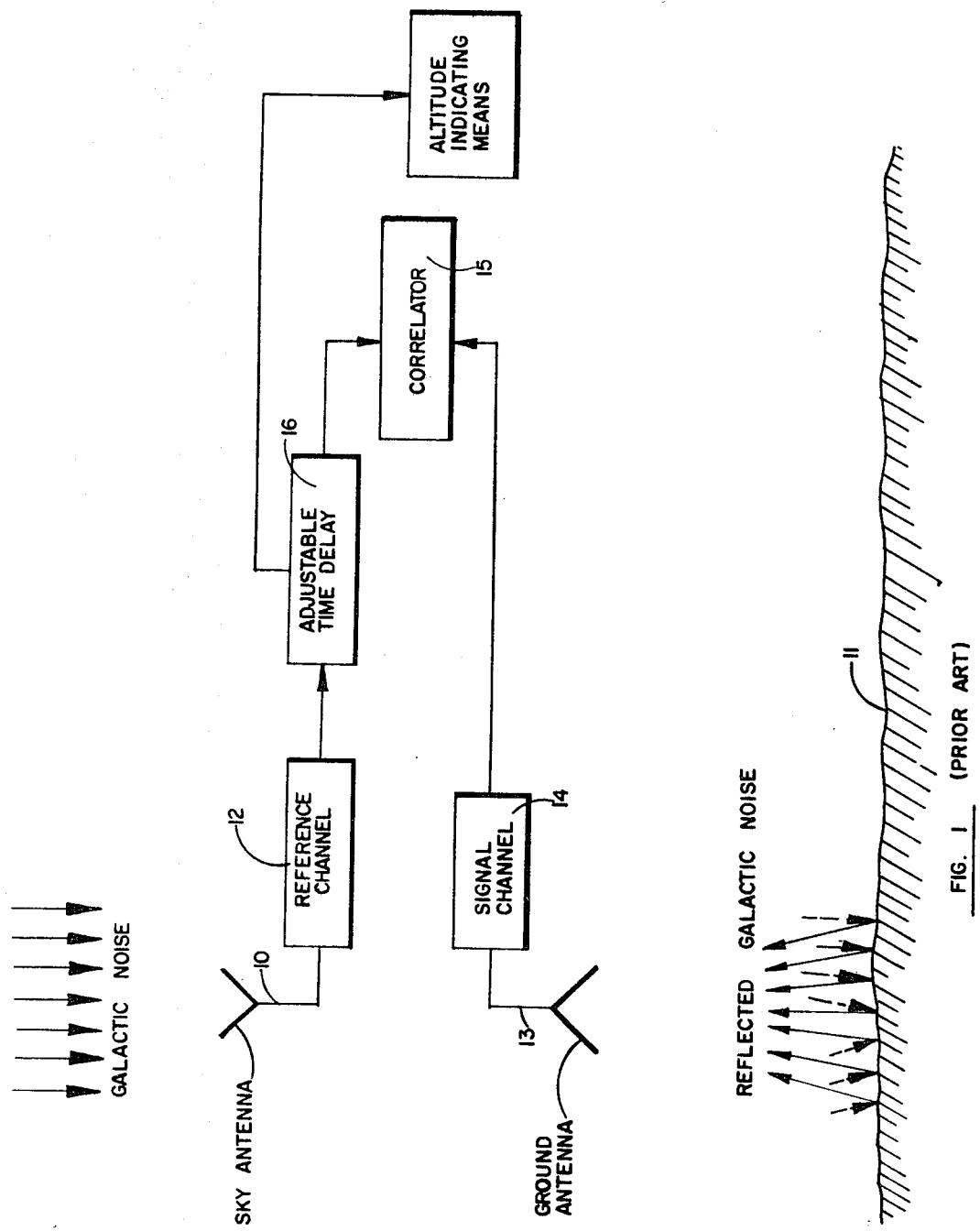
FIGURE 1 is a block diagram of a correlator employed in a passive altimeter function.

Referring now to FIGURE 1, there is illustrated a correlator employed in an airborne passive altimetry function. There is provided an upward looking sky antenna 10 adapted to be responsive to galactic noise or other energy source located above antenna 10 and radiating toward the terrain 11 located below antenna 10, for providing a reference signal at the output of reference channel 12. A corresponding downward-looking receiver antenna 13 receives echoes of the galactic noise-reflected from the terrain 11 to provide a received signal at the output of signal channel 14. Such reference and echo signals may be provided, for example, by the noise-modulated 1420 megacycle hydrogen line emitted by the sun or the Milky Way, as described in the above noted U.S. Patent 3,171,126 to Wiley.

The outputs of channels 12 and 14 are fed to a correlator 15 for providing an output signal indicative of the time-integrated product of the inputs thereto, an adjustable time delay 16 being interposed between one of channels 12 and 14 and an associated input to correlator 15. By adjusting delay element 16 until a delay is achieved in the reference signal output of correlator 15, which corresponds to the range time interval for the galactic energy to traverse the distance from the antenna to the terrain and be reflected at downward-looking antenna 13, the time-average output of correlator 15 reaches a maximum. Hence, by noting the inserted time delay associated with such maximum output, the height above the terrain may be determined.

The principles of time domain correlation are treated with sophistication in the classical literature. However, such principles will be reviewed here in a simplified form for convenience in appreciating the inventive concept.

Figure 2:
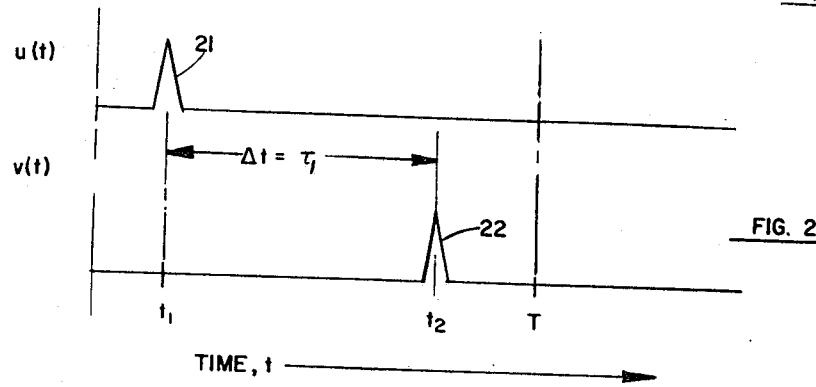
FIGURES 2–5 are time histories illustrating the principles of time-domain correlation.
Figure 3:
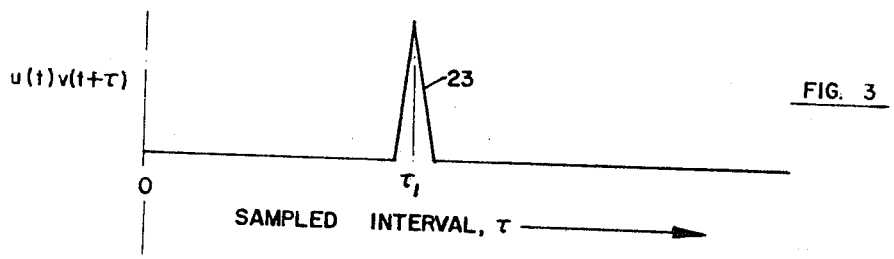

For a $u(t)$ reference signal source (pulsed as indicated in FIGURE 2 by pulse 21 at time $t_1$) and a resulting $v(t)$ pulse echo received at time $t_2$ (as indicated by pulse 22), all within a time interval T, a function may be plotted of the product of the transmitted and received amplitudes as a function of the intervening interval $\tau$ subsequent to $t_1$, as shown in FIGURE 3. In other words, the product $u(t_1)v(t_1+\tau)$, has a finite value other than zero only for the value $\tau_1$ for $\tau$. For all other values of $\tau$, the product is zero because the value of $v(t_1+\tau)$ is zero within the interval T observed. Hence, the peak of curve 23 at $\tau_1$ in FIGURE 3 indicates (1) a correlation between $u(t_1)$ and $v(t_1+\tau)$ and (2) that such correlation is a maximum for $(\tau=\tau_1)$.

Figure 4:
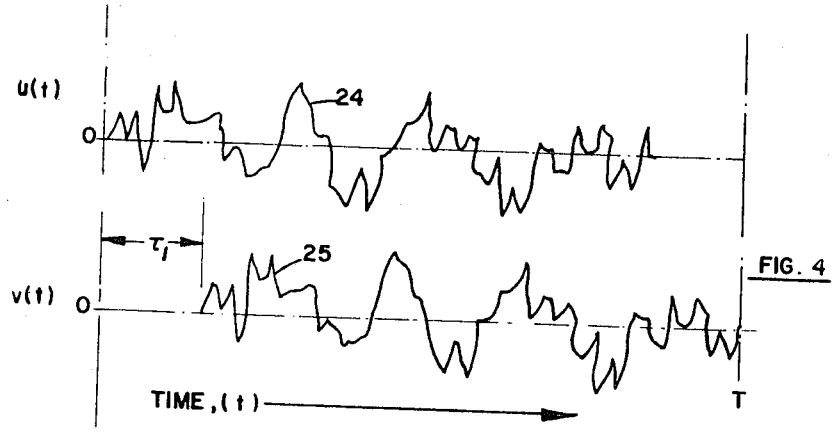
Figure 5:
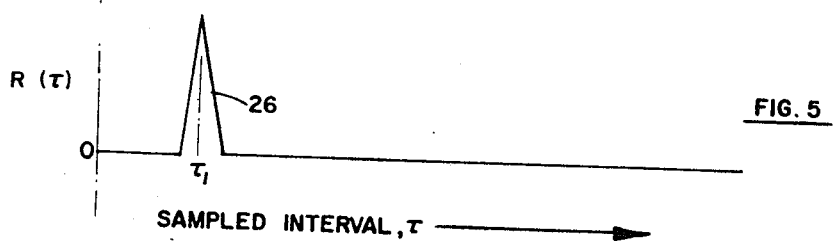

In a practical utilization of the correlation technique, such as in the device of FIGURE 1, a reference waveform $u(t)$ and a received signal $v(t)$ may be continuously observed over the duration of a selected interval T for selected values of an adjustable delay interval $\tau$, as shown in FIGURES 4 and 5. Adjustment of such delay interval is provided in FIG. 1 by adjustment of element 16 in FIG. 1. The reference waveform $u(t)$ (curve 24 of FIGURE 4) is continuously multiplied by an associated value $v(t+\tau)$ (curve 25 of FIGURE 4) for a selected sampled delay interval $\tau$, and the products thus obtained for each value of $t$ within the observation interval T are then time-averaged to provide an indication of the correlation coefficient, $R(\tau)$, (curve 26 in FIGURE 5):

$$R(\tau)=\frac{1}{T}\int_0^T u(t)v(t+\tau)dt \qquad (1)$$

Where the waveform $v(t)$ of FIGURE 4 is an attenuated echo of the waveform $u(t)$ and delayed relative thereto (as for example under the circumstance illustrated in FIGURE 1), then the correlation coefficient $R(\tau)$ is a maximum for the corresponding value of such delay, shown as $\tau_1$ in FIGURE 5. Hence, as indicated above in connection with the description of FIGURE 1, the range-time or altitude represented by a delay may be determined by observing that delay $\tau$ associated with a maximum of the term $R(\tau)$. The accuracy of the curve 25 obtained for $R(\tau)$ in FIGURE 5 improves as the integration interval T, over which the integration of FIGURE 4 and Equation 1 are made, increases. Such integration interval, however, is limited in "on stream processing" such as the altimeter application illustrated in FIGURE 1, by the quantitative rate of change of the data sought. The response indicated by curve of FIGURE 5 may be generated by a unipolar video-detector signalling system where such detection occurs, for example, in the signalling channels of the device of FIGURE 1 prior to being applied to the adjustable time delay 16 and correlator 15. A disadvantage of such video detector arrangement is the reduced sensitivity of the system response. In other words, because the video detection process is responsive only to the amplitude, and not to the phase, of the signals being detected, a correlator responsive to such video detected signals does not display the same high degree of sensitivity, as would an A-C or intermediate frequency signal processor which is responsive to both the amplitude and phase-relationship between the reference and received intermediate frequency signals lying within the bandpass of such intermediate frequency processor. Such reduced sensitivity of the video signal correlator means that it cannot track or respond as well to a signal of interest having an extremely low signal-to-noise ratio, or a signal level which is small relative to the internally generated noise level within the data processor itself.

On the other hand, the coherent output of an intermediate frequency correlator to a reference signal and a received signal between which a high degree of correlation or coherence exists, is extremely sensitive, being able to respond to signals lying well below the system noise level. Such increased sensitivity is due to the fact that the intermediate frequency correlator is responsive to both the amplitude and phase relationship between like frequency components of the reference and received signals lying within the system bandpass limits. Such phase relationship is referred to in the art as the cosine factor, from the fact that the scalor product $R(\omega_1)$ of two phasors or A-C signals of like frequency $(\omega_1)$ is attenuated by the cosine of the phase angle $\theta$ between them:

$$R(\omega_1) = u(\omega_1) v(\omega_1) \cos \theta \tag{2}$$

In the IF correlator of the subject invention, the intermediate frequency $\omega_{IF}$ corresponds to the frequency $(\omega_1)$ of Equation 2. The magnitude of the phase angle term $\theta$ may be contributed to by the delay $\tau$ of the correlation process and will vary for the center frequency $\omega_{IF}$ of the correlator as the selected value of $\tau$ varies. Further, because the cosine function is periodic, the envelope of the output of an intermediate frequency correlator will differ from that of a video correlator (as shown in FIGURE 5), in that a periodicity is introduced, as shown more fully in FIGURE 6. Such periodicity represents an ambiguity in the correlator output, there being several points of inflection for curve 27 of FIGURE 6, as compared to only one for that of FIGURE 5. Curve 27 of FIGURE 6 has been normalized as a function of amplifier bandwidth $b$, and represents the autocorrelation function $R(\tau)$ for a single-tuned intermediate frequency system having a center frequency $\omega_0$ equal to six times the bandwidth $b$, while curve 28 represents the envelope of curve 27. In an actual equipment, the style of curve 27 varies as a function of the ratio $b/\omega_0$, and the shape of the amplifier bandwidth (single-tuned, double-tuned, rectangular filter, etc.). The arrangement of curve 27 within the envelope 28 may, instead of the symmetrical arrangement illustrated, be skewed (to the right or left) due to fixed delays or phase-biases in the system.

Figure 6:
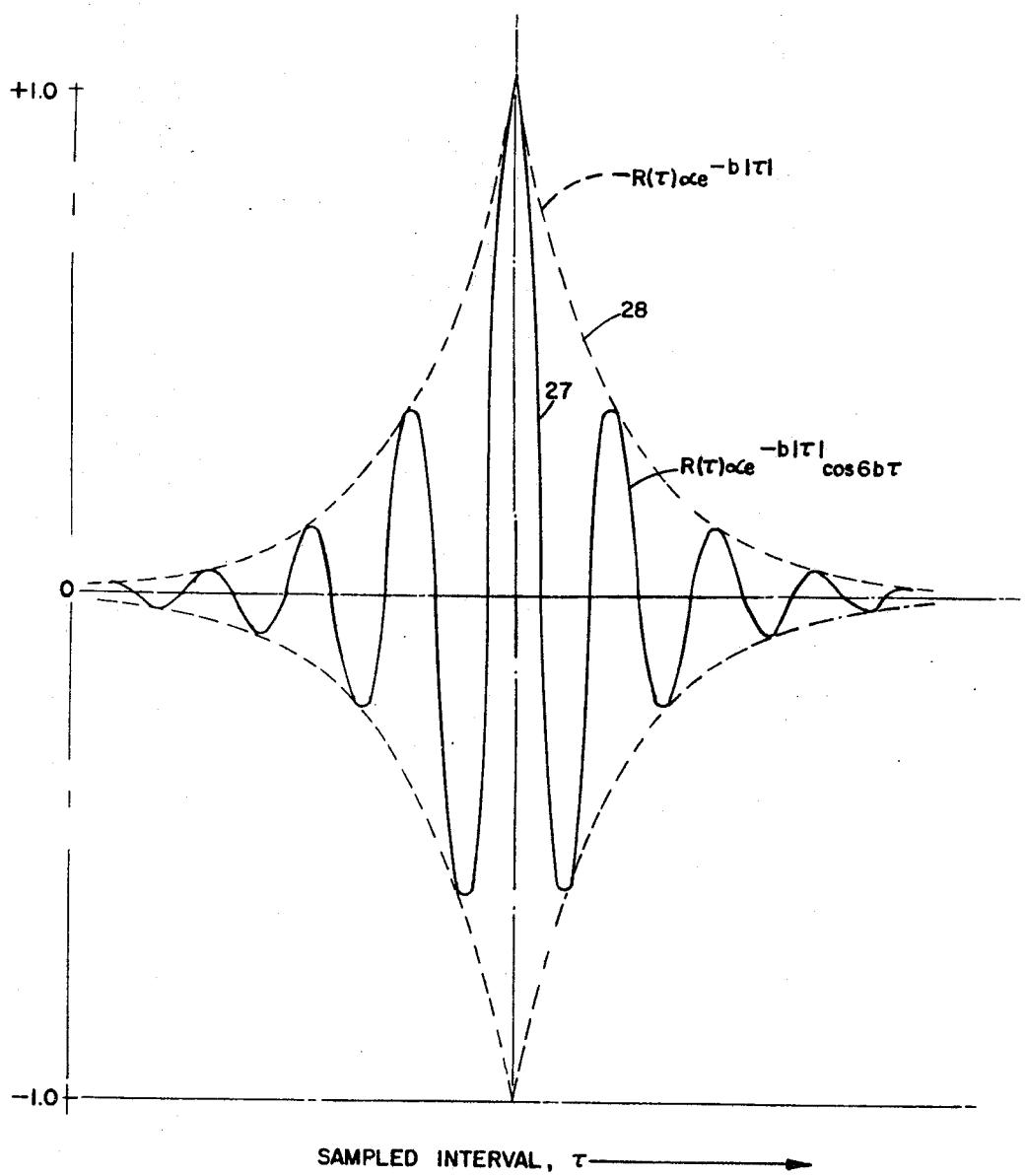
FIGURE 6 is a representative curve of the correlation coefficient $R(\tau)$ for a prior art intermediate frequency type correlator.
Figure 7:
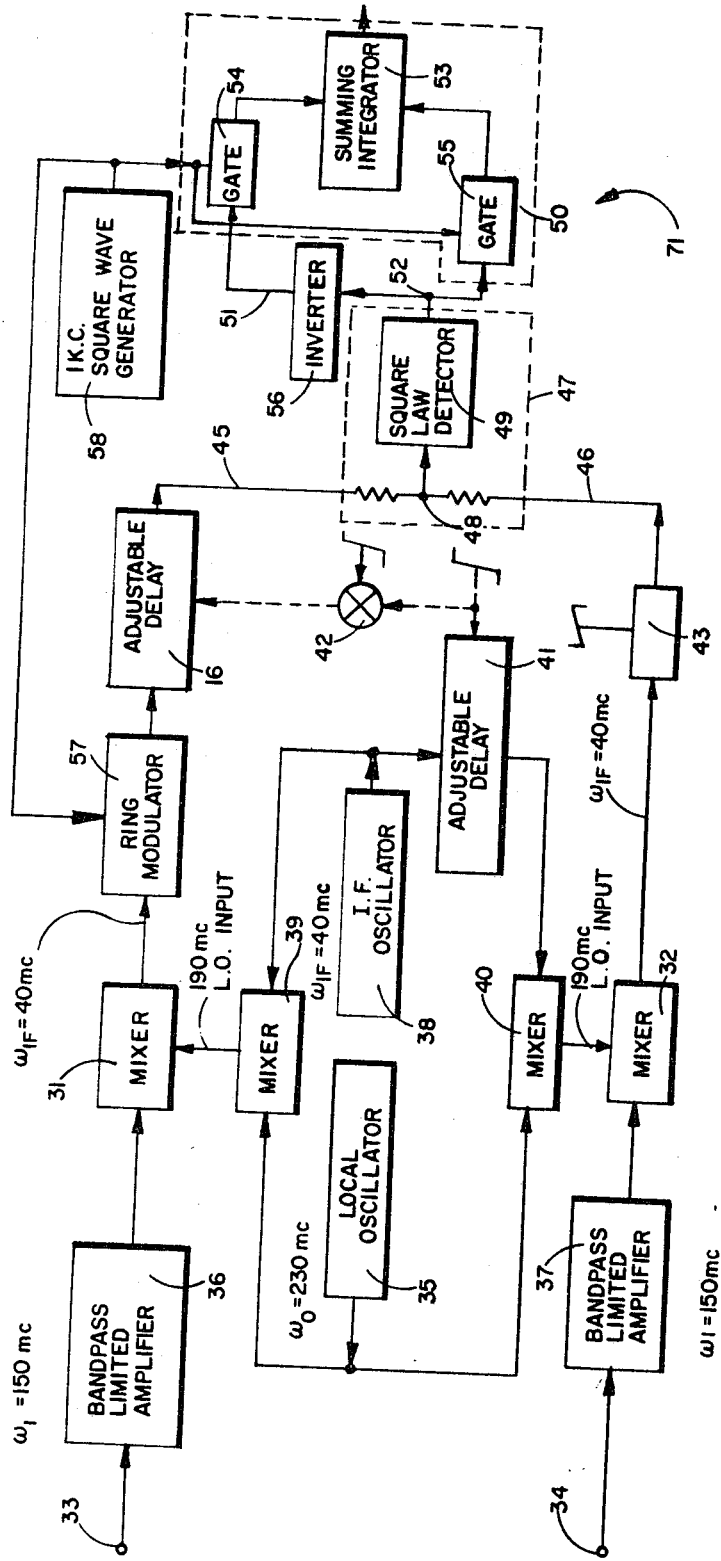
FIGURE 7 is a block diagram of a system embodying the concept of the invention.

The ambiguities or cosine sensitivity factor of curve 27 in FIGURE 6 may be avoided by means of the device of the invention, shown more particularly in FIGURE 7.

Referring now to FIGURE 7, there is illustrated in block diagram form a system embodying the concept of the invention. There are provided two intermediate frequency signalling channels, comprising a first and second mixer 31 and 32, each having a first input responsively coupled to a mutually exclusive one of two input terminals 33 and 34, and further having a second or local oscillator input thereof responsively connected to a local oscillator 35 (by means of respective ones of mixers 39 and 40, for reasons which will be more fully explained hereinafter). A bandpass limited amplifier 36 and 37 may be interposed between each of input terminals 33 and 34 and an associated one of mixers 31 and 32 to amplify a reference signal or received signal input thereto to a sufficient level to enable beating or mixing with the local oscillator input for providing an intermediate frequency output, as is well understood in the art.

The intermediate frequency reference signal is then delayed by an adjustable delay element 16. The intermediate frequency received signal (from mixer 32) and the delayed intermediate frequency reference signal (from delay element 16) are then applied as separate inputs to an integrating product detector or correlator.

A practical reason for employing delay element 16 in conjunction with the intermediate frequency stage or output of mixer 31 is that commercially available adjustable delay elements normally demonstrate extremely small bandpass limits, an optimum bandpass performance being currently obtainable in the art at a 40 mc. center frequency. Accordingly, the center frequency $\omega_1$ of input amplifiers 36 and 37 may be selected for amplifying a noise-modulated spectral line of interest, such as for example 150 mc., and the local oscillator frequency input to each of mixers 31 and 32 is selected as differing from $\omega_1$ by the preselected amount of the intermediate frequency of 40 mc. Hence, a local oscillator frequency input of 190 mc., when mixed with the 150 mc. center frequency input to mixers 31 and 32 produces a lower side band or intermediate frequency output of 40 megacycles. The associated upper side frequency may be suppressed by the use of bandpass limited output stages or intermediate frequency amplifiers (not shown) having a center frequency equal to the 40 mc. intermediate frequency, as is well understood in the art.

While delay element 16 provides the sampled delay interval ($\Delta t = \tau$) for which a correlation measurement is desired, such sampled delays also produce an incremental phase shift $\Delta \phi$ for the intermediate frequency $\omega_{IF}$:

$$\Delta \phi \text{ (radians)} = \tau \text{ (secs.) } \omega_{IF} \text{ (rad./sec.)} \tag{3}$$

Each of such delays also produce associated phase shifts for the side frequencies included in the bandwidth of the intermediate frequency signalling channel (including the restrictive bandpass element of the delay means 16, itself), which would result in an ambiguous correlator response to a range of values for the delay $\tau$ (as discussed in connection with the description of FIGURE 6), unless otherwise compensated for.

There is further provided in the ararngement of FIGURE 7, means for compensating for the variable frequency-responsive phase shift introduced by delay element 16. Such compensating means comprises ancillary intermediate frequency means for changing the frequency of the local oscillator input to each of mixers 31 and 32 of the intermediate frequency channels by a preselected amount, and includes a source 38 of a second local oscillator frequency corresponding to the intermediate frequency, $\omega_{IF}$, a first and second ancillary mixer 39 and 40, each having an output coupled to the local oscillator input of a mutually exclusive one of first and second mixers 31 and 32, a first and second input respectively coupled to a respective one of local first oscillator 35 and intermediate frequency oscillator 38. Hence, in order to now provide a 190 mc. local oscillator input to each of the intermediate frequency stages represented by mixers 31 and 32, the frequency of first local oscillator 35 must now be adjusted to 230 mc., thereby differing from the signal center frequency $\omega_1$ by 2$\omega_{IF}$. Such compensatory feature further includes adjustable phase shifting means for compensatory phase shifting the ancillary intermediate frequency change of the frequency-changed local oscillator input applied to one of the intermediate frequency signal channels. Such compensatory phase shift means may comprise an adjustable delay element 41, constructed similarly as element 16, and being mechanically ganged thereto, whereby adjustment of delay element 16 also adjusts delay element 41. Ancillary delay element 41 is interposed in series circuit between the output of intermediate frequency oscillator 38 and the associated input to ancillary mixer 40, thereby producing a phase shift at the $\omega_{IF}$ input to mixer 40 relative the corresponding input to mixer 39. Because delay element 41 is adjusted concomitantly with adjustment of delay element 16, a like change in delay is commonly produced in both of elements 16 and 41. Also, because such changes in delay are applied to signals of like frequency $\omega_{IF}$, a like phase shift occurs in both the intermediate frequency reference signal (occurring at the output of delay element 16) and in the intermediate frequency signal used to change the local oscillator frequency input to IF mixer 32. Now, such latter phase-shift will be translated unchanged to the intermediate frequency output of mixer 32, as will be explained more fully hereinafter. Hence, because like-magnitude phase shifts occur in both the intermediate frequency inputs applied to the integrating product detector 71, a differential phase shift between such intermediate frequency inputs, due to adjustment of delay element 16 for varying the delay interval sampled, is minimized.

That a compensatory phase shift injected by an ancillary local oscillator source to one of two intermediate frequency channels is translated without change in magnitude, may be appreciated from the following analytical presentation.

The two inputs to ancillary first mixer 39 may be indicated in complex operator notation as $E_A e^{j(\omega_0 t + \phi_A)}$ and $E_B e^{j(\omega_{IF} t + \phi_B)}$, and the resulting lower sideband output indicated as the product therefor:

$$E_A e^{j(\omega_0 t + \phi_A)} E_B e^{-j(\omega_{IF} t + \phi_B)} = E_m e^{j[(\omega_0 - \omega_{IF})t + (\phi_A - \phi_B)]} \quad (4)$$

where:

$$E_m = E_A E_B$$

and where the minus sign employed with the second complex operator indicates that the lesser frequency $\omega_{IF}$ is being subtracted from the greater frequency $\omega_0$ in effecting lower sideband mixing.

The input to second ancillary mixer 40 may be similarly indicated in complex operator notation with the inclusion of an additional phase shift term, $\Delta\tau\omega_{IF}$, for the phase shift contributed by the delay element 41:

$$E_A e^{j(\omega_0 t + \phi_A)} E_B e^{-j(\omega_{IF} t + \phi_B + \Delta t \omega_{IF})}$$
$$= E_m e^{j[(\omega_0 - \omega_{IF})t + (\phi_A - \phi_B) - \Delta t \omega_{IF}]} \quad (5)$$

Hence, the respective local oscillator inputs to intermediate frequency elements 31 and 32 are seen from Equations 4 and 5 to be of like frequency $(\omega_0 - \omega_{IF})$ up to $(\omega_0 - \omega_{IF})$. It is noted, however, that the sense of the frequency translated phase has been reversed.

An additional frequency translation by the center frequency $\omega_1$ of the limited bandpass receiver inputs to each of first and second mixers 31 and 32 similarly does not change the magnitude of the differential phase angle $-\Delta t\omega_1$ contributed by delay element 41. Representing the respective center frequency inputs to first and second mixers 31 and 32 as $E_1 e^{j(\omega_1 t + \phi_1)}$ and $E_2 e^{j(\omega_1 t + \phi_2)}$, the resultant intermediate frequency output is indicated as the product of such receiver input and the associated one of the local oscillator inputs indicated by Equations 4 and 5. For example the intermediate frequency output of first mixer 31 is $$E_m e^{j[(\omega_0 - \omega_{IF})t + (\phi_A - \phi_B)]} E_1 e^{-j(\omega_1 t + \phi_1)}$$
$$= E'_1 e^{j[\omega_{IF} t + (\phi_A - \phi_B - \phi_1)]} \quad (6)$$

where:

$$E'_1 = E_m E_1$$
$$\omega_0 - \omega_1 = 2\omega_{IF}$$

and therefore:

$$(\omega_0 - \omega_1 - \omega_{IF}) = \omega_{IF}$$

Note that a minus sign is used with the complex operator for the lower frequency $\omega_1$ in effecting lower sideband mixing.

Similarly, the intermediate frequency output of second mixer 32 is:

$$E_m e^{j[(\omega_0 - \omega_1)t + (\phi_A - \phi_B) - \Delta t \omega_{IF}]} E_2 e^{j(\omega_1 t + \phi_2)}$$
$$= E'_2 e^{j[\omega_{IF} t + (\phi_A - \phi_B - \phi_1) - \Delta t \omega_{IF}]} \quad (7)$$

Hence, the net phase difference between the two intermediate frequency products of Equations 6 and 7 is the algebraic sum of that phase difference $(\phi_1 - \phi_2)$ between the two received center frequency inputs applied to respective ones of mixers 31 and 32, and the phase shift $\Delta t \omega_{IF}$ contributed by element 41. Any additional phase shift or biases due to lack of symmetry between the two intermediate frequency channels may be compensated for by the rigging or differential adjustment of the ganging between delay elements 16 and 41 or by separate adjustment of the delay element 16. Such separate or differential adjustment of element 16 relative to that of element 41 may be accomplished for example, by the interposition of differential means 42, as shown in FIGURE 7. Alternatively, an additional, separately-adjusted delay element 43 may be interposed in series electrical circuit with the output of mixer 32.

It is noted that although the magnitude of the incremental phase shift $\Delta t \omega_{IF}$ contributed by adjustment of element 41 concomitantly with element 16, is the same as that provided by element 16, yet the sense or sign thereof may be reversed relative thereto, depending upon the frequency mixing technique used. For example, where the 190 mc. local oscillator input to the intermediate frequency stages is determined as the difference between a first local oscillator frequency of 230 mc. and a phase-shifted lesser ancillary frequency of 40 mc., the sense of the phase shift contributed by the phase-shifted lesser frequency is reversed in the resultant lower side band output. Further, where the frequency of an intermediate frequency signal is determined as the frequency difference between such local oscillator frequency (190 mc.) having a sense-reversed phase-shift and the lesser frequency of a center frequency (150 mc.) receiver signal, such incremental phase shift does not undergo any further or subsequent sense change. Hence, the result in the arrangement of FIGURE 7 is that the sense of the phase-shift inserted in a selected one of the intermediate frequency channels by an adjustment of delay element 41 is of opposite sense to that caused by a like adjustment of element 16. Therefore, the differential phase shift provided between the two intermediate frequency channels by element 16 may be compensated for by interposing delay element 41 in that local oscillator feed which feeds the same intermediate frequency channel served by element 16 (e.g., interpose element 41 between oscillator 38 and mixer 39, rather than as shown).

Alternatively, like delay elements 16 and 41 may be ganged to operate oppositely, whereby delay adjustments of like magnitude and mutually opposite sense are provided with delay element 41 cooperating with mixer 40 as shown. In such later arrangement, such opposite ganging arrangement will require the insertion of a delay-bias in the rigging of elements 16 and 41, which may be compensated for by adjustment of differential element 42 and delay element 43, as discussed above.

The differentially time-delayed, compensatorily phase-shifted intermediate frequency inputs on input lines 45 and 46 of the integrating product detector 71 are then processed to provide a continuously time averaged output signal indicative of the function, $$R(\tau_1) = \frac{1}{T} \int_0^T v(t) u(t + \tau) dt$$

The processor or correlator 71 comprises square law detection means 47 responsive to the sum of the delayed first and the second intermediate frequency signals. Such means may include an input summing network 48 and a square law-detector 49 constructed and arranged by means well understood in the art. There is also provided gated integrating means 50 having a first and second gated summing input 51 and 52 responsive to the output and phase-inverted output respectively of detection means 47. Such summing integrator may be comprised of an operational summing amplifier 53 having a first order lag time-constant corresponding to a preselected integration interval T over which the integration process of Equation 1 is performed, with gating means 54 and 55 interposed at a respective one of the summing inputs thereto. The phase conversion of the detector output, applied as an input to the gated summing integrator 50, may be achieved by means of a phase-inverting amplifier 56 or other measures known in the art for performing such function.

There is further provided in FIGURE 7 periodic phase-inversion means such as a ring modulator 57 interposed in series with one of the intermediate frequency signal inputs 45 and 46 to the integrating product detector, for periodically inverting the phase of such signal in synchronism with the periodic gating on of the gated inputs of integrator 53. Such synchronous operation of ring modulator 57 and gates 54 and 55 is achieved by means of a 1 kc. gating signal generator, the output of which is commonly applied as a control signal to ring modulator 57 and gates 54 and 55. (The construction and arrangement of a ring modulator is well known in the art, as indicated for example at page 51 of the text, "Single Sideband Principles and Circuits," by Pappenfus, Bruene and Schoenke, published by McGraw-Hill (1964).)

In normal operation of the above described correlator, detector 49 cooperates as means for providing a signal indicative of the square of the detected sum of the inputs ($u$ and $v$) thereto:

$$(u+v)^2 = u^2 + 2uv + v^2 \quad (8)$$

The cooperation of ring modulator 57 with detector 49 serves to alternatively reverse the phase of one of the inputs thereto, whereby on a time shared basis there is also provided a signal indicative of the square of the detected difference between $u$ and $v$:

$$(-u+v)^2 = u^2 - 2uv + v^2 \quad (9)$$

In other words, the cooperation of ring modulator 57 causes detector 49 to provide a time-shared output indicative alternately of each of Equations 8 and 9. Further, the cooperation of static phase-inversion means 56 and gated summing integrator 50 with the output of detector 49 provides means for differentially combining the squared signals described by Equations 8 and 9, resulting in a time-averaged or smoothed output indicative of the product of the second and delayed first intermediate frequency signals:

$$(u+v)^2 - (-u+v)^2 = [u^2 + 2uv + v^2] - [u^2 - 2uv + v^2] \quad (10)$$

$$(u+v)^2 - (-u+v)^2 = 4uv \quad (11)$$

Figure 8:
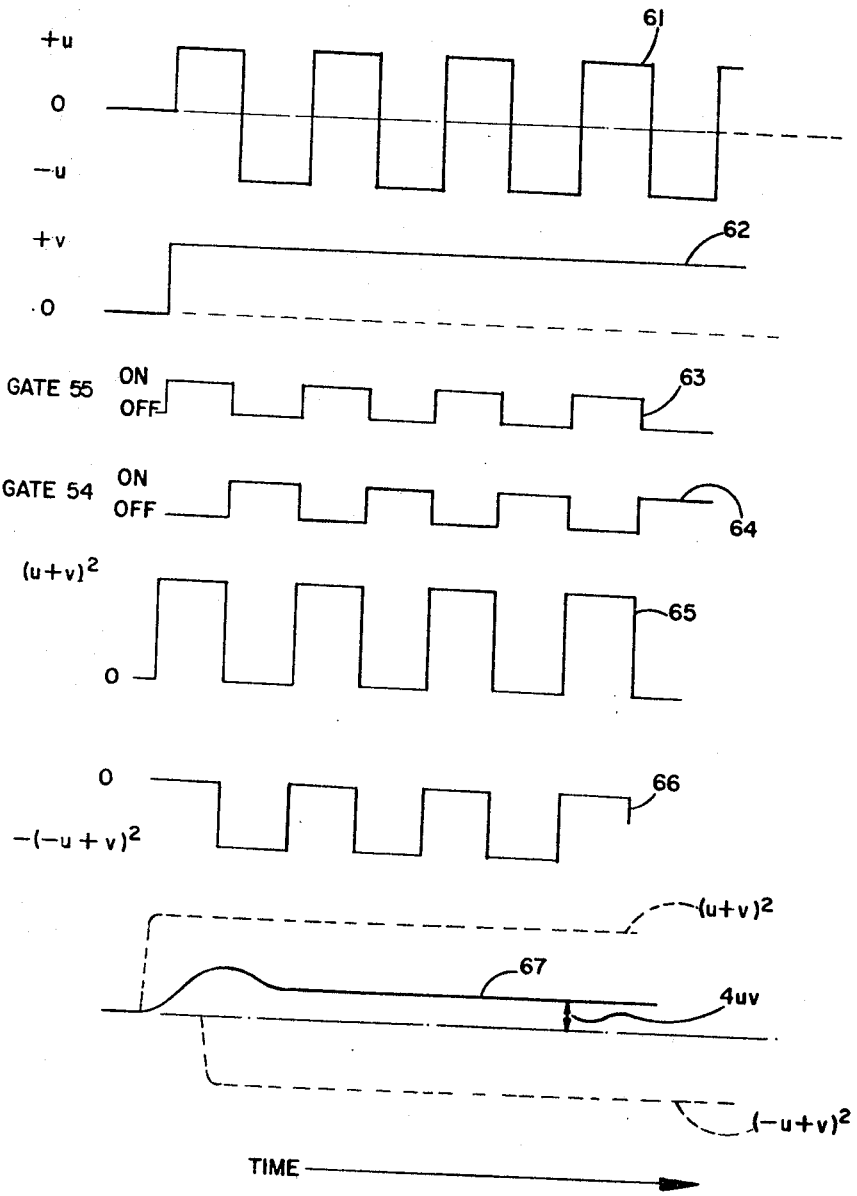
FIGURE 8 is a family of time histories illustrating the responses of certain elements of FIG. 7.

Such operation of the device of FIGURE 7 to provide a signal indicative of the time averaged product ($uv$) may be more clearly appreciated by reference to the time histories of FIGURE 8.

Referring to FIGURE 8, there is illustrated a family of time histories of the operation of certain elements in the device of FIGURE 7. There are illustrated curves 61 and 62 indicative of the periodically phase-inverted output of ring modulator 57 and the output of mixer 32, respectively. Rather than differentiate between phase-inverted IF signals and video detected signals, curves 61 and 62 have been represented as phase-detected video envelopes for ease of representation. The synchronous operation of a first state of ring modulator 57 with an "ON" state of gate 55 of FIGURE 7 (shown as curve 63) provides the $(u+v)^2$ signal input stored in integrator 53, indicated by curve 65 in FIGURE 8. In the second state of ring modulator 57 in synchronism with the "ON" state of gate 54 shown by curve 64 (and "OFF" state of gate 55), the phase-inverted signal ($-u$) of curve 61, combined with the $v$ signal of curve 62 are processed to provide a $-(-u+v)^2$ signal, indicated by curve 66. These two inputs are then stored in integrator 53 to provide a net output indicative of the algebraic sum described by Equation 11 and illustrated by curve 67 in FIGURE 8.

In the practical design of the product detector 71 of FIGURE 7, it is necessary that the frequency of the periodic gating signal be substantially less than the intermediate frequency of the input signals being processed; and that the break frequency represented by the time constant of integrator 53 be much less than the frequency of the periodic gating signal generator 58, while larger than the break frequency or dynamic response limits of the controlled element to be controlled by the output signal. The first of such conditions is met by the illustrated 1 kc. gating signal which is much less than the 40 mc. intermediate frequency of the signals to be correlated. Further, a time constant of .31 second for integrator 53 corresponds to a break frequency of about 3 radians a second or .5 cycle per second, which is substantially less than the time-sharing frequency of 1 kc. as to smooth or time-average the time-shared data inputs thereto. Moreover, such .5 c.p.s. data rate is deemed sufficiently large relative to the altitude response rate of most aircraft as to be satisfactory for an altimeter application. For example, the .31 second data smoothing time is shorter than the 1.5–5 second response time of most aircraft altitude control loops.

In the utilization of the arrangement of FIGURE 7 in a practical application, such as for example altimetry, the optimum sampling interval $\tau$ which provides a non-ambiguous maximum output from product detector 71, may vary with time, thereby requiring a continuous adjustment of delay means 16 for tracking such optimum interval. Such tracking may be achieved by means of a second product detector in parallel with the first, as shown more particularly in FIGURE 9.

Figure 9:
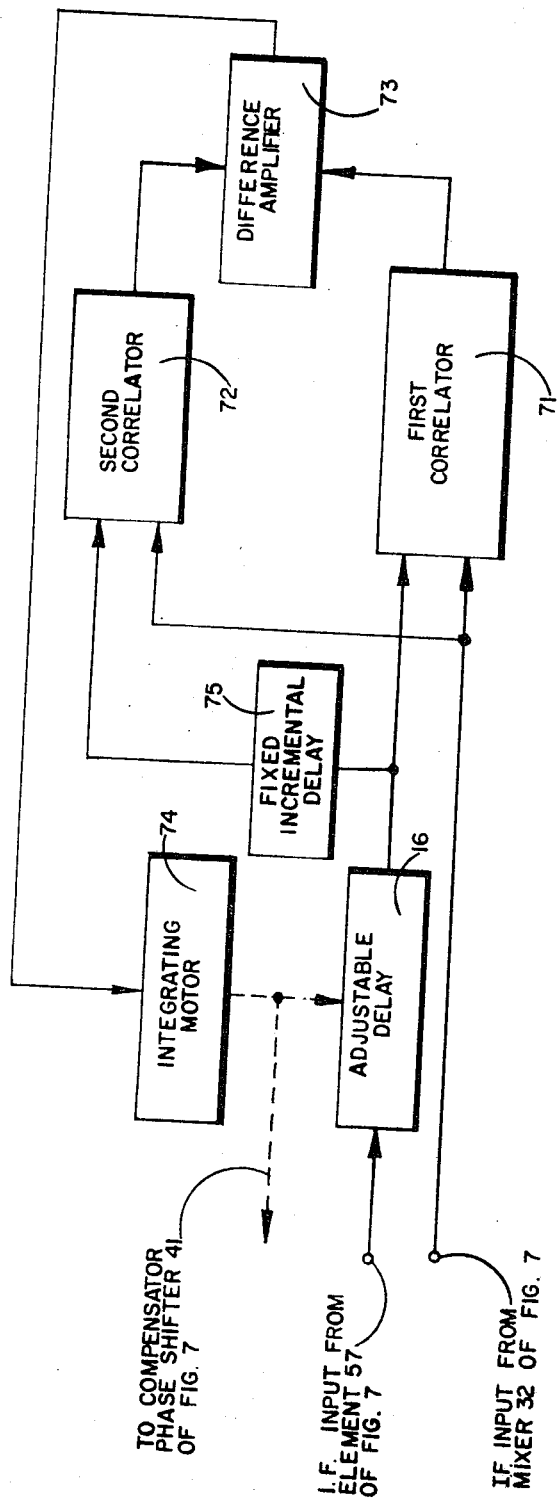
FIGURE 9 is a tracking arrangement for the device of FIG. 7, utilizing two product detectors.
Figure 10:
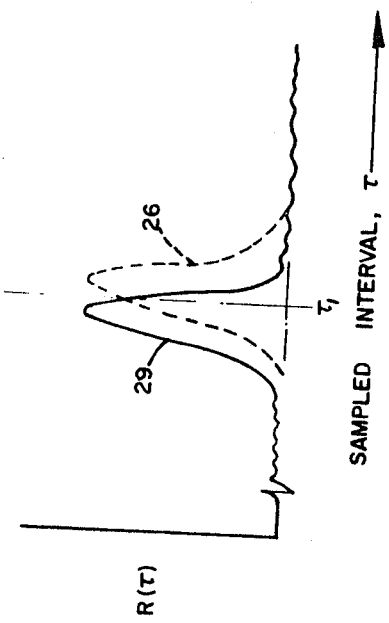
FIGURE 10 is a graph of the several responses of the two correlators of FIG. 9.

Referring now to FIGURE 9, there is illustrated an arrangement for automatically tracking a variable optimum sample interval. There is provided the adjustable delay 16 and a first correlator 71 (corresponding to elements 47, 50, 56 of FIGURE 7), and arranged to cooperate with the two compensated intermediate frequency stages of FIGURE 7. There is also provided a second correlator 72, similarly constructed and arranged as first correlator 71 and connected in parallel therewith, a fixed incremental delay 75 being interposed in one of the inputs to second correlator 72. By means of such slight delay, the response $R_2(\tau)$ of second correlator 72 is slightly biased relative to that $R_1(\tau)$ of first correlator 71, as shown by the pair of response curves 26 and 29 in FIGURE 10. Hence, by comparing the detected outputs of correlators 71 and 72 by means of a difference amplifier 73, a tracking signal is provided, the sense of which is indicative of whether the optimum value for the changing sampling interval is slightly greater than or less than that value $\tau_1$ for which the resulting output of difference amplifier 73 is zero. Such difference, or tracking error, signal is then fed to an integrating motor 74 which is drivingly arranged to continuously adjust delay means 16 in such a sense or direction as to reduce the output of difference amplifier 73. In this way, the shaft displacement of motor 74 causes delay means 16 to continuously track optimum value for $\tau$. Accordingly, a pickoff may be made to cooperate with such shaft to provide a continuous indication of the altitude corresponding to such shaft displacement and optimum sampled interval. Such pickoff (not shown) may be either an analog type or a digital type, as is well understood in the art.

Although the device of the invention has been described in terms of its utility in a passive altimeter application, it is to be clearly understood that the concept of the invention is not so limited, the device being useful in any application requiring the correlation of two time varying signals.

Hence, there has been described a correlator for providing an output having the increased sensitivity of a fully coherent intermediate frequency processor, and which provides an unambiguous result of a video detected processor. In other words, the device combines the several advantages of prior art intermediate frequency processors and video detected processors, without suffering the associated disadvantageous performance features of each. Accordingly, there has been described an improved correlator.

Although the invention has been described and illustrated in detail, it is to be clearly understood that the same is by way of illustration and example only and is not to be taken by way of limitation.

We claim:

1. In a two-channel correlator for determining the sampling interval $\tau$ for maximizing the function, $$R(\tau) = \frac{1}{T}\int_0^T u(t)v(t+\tau)dt$$

of the type employing intermediate frequency stages, each channel being of an intermediate frequency type responsive to a common preselected intermediate frequency and having a mixer with a local oscillator input responsive to a single common local oscillator frequency, the improvement of means for reducing the cosine sensitivity factor in the coherent response of said correlator to the sampled interval $\tau$, comprising in combination
  ancillary intermediate frequency means for changing the frequency of the local oscillator input to each of said intermediate frequency channels by a preselected amount; and
  adjustable phase-shifting means for compensatorily phase-shifting the frequency of the frequency-changed local oscillator input applied to one of said intermediate frequency signal channels,
  whereby any differential phase shift introduced between the outputs of said channels by said sampling interval $\tau$ is reduced.

2. In a two-channel correlator for determining the sampling interval $\tau$ for maximizing the function, $$R(\tau) = \frac{1}{T}\int_0^T u(t)v(t+\tau)dt$$

of the type employing intermediate frequency stages, each channel being of an intermediate frequency type responsive to a common preselected intermediate frequency and having a mixer with a local oscillator input responsive to a first common local oscillator frequency, the improvement of means for reducing the cosine sensitivity factor in the coherent response of said correlator to the sampled interval $\tau$, comprising in combination
  ancillary intermediate frequency means for changing the frequency of the local oscillator input to each of said intermediate frequency channels by an amount equal to said preselected intermediate frequency; and
  adjustable phase-shifting means for compensatorily phase-shifting the frequency of the frequency-changed local oscillator input applied to one of said intermediate frequency signal channels,
  whereby any differential phase shift introduced between the outputs of said channels by said sampling interval $\tau$ is reduced.

3. The device of claim 2 in which said ancillary intermediate frequency means comprises
  a source of a second local oscillator frequency corresponding to said preselected intermediate frequency; and
  a first and second frequency mixer each having an output coupled to the local oscillator input of a mutually exclusive one of said intermediate frequency channels, a first input responsive to said first local oscillator frequency, and a second input responsively coupled to said source,
  said phase shifting means being interposed in series circuit between said source and the associated input to one of said two frequency mixers.

4. The device of claim 2 in which said adjustable phase shifting means is coupled to cooperate with the selectively sampling function of said correlator for selecting sampling intervals $\tau$.

5. A two-channel correlator for automatically determining that interval for maximizing the function, $$R(\tau) = \frac{1}{T}\int_0^T u(t)v(t+\tau)dt$$

and comprising in combination
  a first and second intermediate frequency channel, each having a mixer with a local oscillator input responsively coupled to a first common local oscillator and a second input adapted to be responsive to a mutually exclusive one of two signals to be correlated, $u(t)$ and $v(t)$;
  first means for providing an adjustable time delay in the output of one of said intermediate frequency channels and corresponding to a sampled interval, $\tau$;
  a first and second product detector, each having a first and second input responsively coupled to an output of a respective one of said intermediate frequency channels, a fixed incremental delay being interposed at an output of one of said detectors;
  second means for driving said first means to adjust the sampled interval $\tau$ in accordance with the difference between the output responses of said product detectors;
  third means for changing the frequency of the local oscillator input of each of said mixers; and
  fourth means in cooperation with said third means for compensatorily phase shifting the frequency change of the frequency-changed local oscillator input of one of said mixers for reducing any differential phase shift introduced between the outputs of said intermediate frequency channels by said sampling interval $\tau$.

6. An intermediate frequency two-channel correlator for determining that interval $\tau$ for maximizing the function, $$R(\tau) = \frac{1}{T}\int_0^T u(t)v(t+\tau)dt$$

and comprising in combination:
  a first and second intermediate frequency channel, each having a bandpass-limited first input with an associated center frequency $\omega_1$ and a local oscillator input for providing an output at a preselected intermediate frequency $\omega_{IF}$;
  adjustable time delay means having an input coupled to an output of one of said two intermediate frequency channels for selectively sampling a delay interval $\tau$;
  product detector means having a first and second input responsively coupled to a respective output of said adjustable time delay means and the other of said two intermediate frequency channels;
  a first source of a first local oscillator frequency $\omega_0$ differing from said center frequency $\omega_1$ by twice the amount of said preselected intermediate frequency, $\omega_{IF}$;
  a second source of an ancillary local oscillator frequency equal to said intermediate frequency, $\omega_{IF}$;
  a first and second mixer, each having an output operatively coupled to the local oscillator input of a mutually exclusive one of said intermediate frequency channels, and a first and second input responsively connected to a respective one of said first and second sources; and
  adjustable phase shift means interposed in series circuit between said second source and one of said mixers and ganged with said adjustable time delay means for introducing a compensatory phase shift change in a preselected one of said local oscillator inputs whereby the differential phase shift introduced between the delay first intermediate frequency output signal of said one channel and the second intermediate frequency output signal of said other channel by said adjustable time delay means is minimized.

7. The device of claim 6 in which said product detector includes means for generating a signal indicative of the square of the detected sum of said delayed first and said second intermediate frequency signals;

means for generating a signal indicative of the square of the detected difference between said delayed first and said second intermediate frequency signals; and means for differentially combining said squared signals to provide a detected output signal indicative of the product of said second and delayed first intermediate frequency signals.

8. The device of claim 6 in which said product detector comprises square law detection means responsive to the sum of said delayed first and second intermediate signals, gated integrating means having a first and second gated summing input responsive to the output and phase-inverted output respectively of said detection means, periodic phase-inversion means interposed in series with one of said intermediate frequency signals for periodically inverting the phase thereof, said inputs to said gated integrating means being gated in synchronism with said periodic phase inversion means.

9. The device of claim 6 in which there is further provided second product detector means responsively connected in parallel with said first mentioned product detector means, a fixed incremental delay being interposed at one of the inputs of said second product detector;

a differential amplifier having a respective first and second input responsively coupled to an output of a respective one of said product detectors for providing a signal indicative of the difference therebetween; and an integrating motor responsive to said output of said differential amplifier and drivingly cooperating with said adjustable time delay means for adjusting said time delay means in such sense as to reduce the magnitude of said output from said differential amplifier.

No references cited.

MALCOLM A. MORRISON, *Primary Examiner.*

FELIX D. GRUBER, *Assistant Examiner.*

U.S. Cl. X.R.

324—77, 85; 343—100

PO-1050
(5/69)

UNITED STATES PATENT OFFICE
CERTIFICATE OF CORRECTION

Patent No. 3,450,869  Dated June 17, 1969

Inventor(s) C. A. Wiley et al

It is certified that error appears in the above-identified patent and that said Letters Patent are hereby corrected as shown below:

Column 9, Equation (10) correct as follows:

$$(u + v)^2 - (-u + v)^2 = [u^2 + 2uv + v^2] - [u^2 - 2uv + v^2] \quad (10)$$

Column 14, delete "No references cited." and insert the following:

References Cited

UNITED STATES PATENTS 3,157,781   11/1964   Gruen------------235-181
3,249,911   5/1966    Gustafsson--------235-181

FOREIGN REFERENCES 724,555   2/1955 Gr. Britain  BR.TH. Houst. Co. 343-100.7

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents